(12) United States Patent
Lai et al.

(10) Patent No.: US 6,941,157 B2
(45) Date of Patent: Sep. 6, 2005

(54) ELECTRONIC DEVICE CAPABLE OF WIRELESS DATA TRANSMISSION ON THE INTERNET

(75) Inventors: Cheng-Shing Lai, Taipei (TW); Zheng-Rong Zou, Nanjing (CN)

(73) Assignee: Inventec Appliances Corp., Taipei (TW)

(*) Notice: Subject to any disclaimer, the term of this patent is extended or adjusted under 35 U.S.C. 154(b) by 691 days.

(21) Appl. No.: 09/956,815

(22) Filed: Sep. 21, 2001

(65) Prior Publication Data

US 2003/0060229 A1 Mar. 27, 2003

(51) Int. Cl.[7] .............................................. H04M 1/00
(52) U.S. Cl. ............................. 455/556.1; 455/556.2; 455/557
(58) Field of Search ......................... 455/556.1, 556.2, 455/557, 425, 426.1, 426.2; 379/93.05, 93.06; 709/203

(56) References Cited

U.S. PATENT DOCUMENTS 6,751,651 B2 * 6/2004 Crockett .................... 709/203

FOREIGN PATENT DOCUMENTS

JP          404104646 A  *  4/1992  .......... H04M/11/00

* cited by examiner

*Primary Examiner*—Melur Ramakrishnaiah
(74) *Attorney, Agent, or Firm*—Birch, Stewart, Kolasch & Birch, LLP

(57) ABSTRACT

The invention relates to an electronic device for wireless data transmission on the Internet. The device comprises a mobile component and a stationary one. The stationary component is connected to a telephone line and the mobile component is connected to the information processing apparatus for Internet access. The information processing apparatus is able to access the Internet and is equipped with a MODEM (Modulation and Demodulation) and USB (Universal Serial Bus) port. Both the MODEM (Modulation and Demodulation) and USB (Universal Serial Bus) port can be moved with the information processing apparatus. The electronic device is designed for wireless data transmission instead of wired Internet access as when the information processing apparatus has to be connected to a telephone line for Internet access.

19 Claims, 7 Drawing Sheets

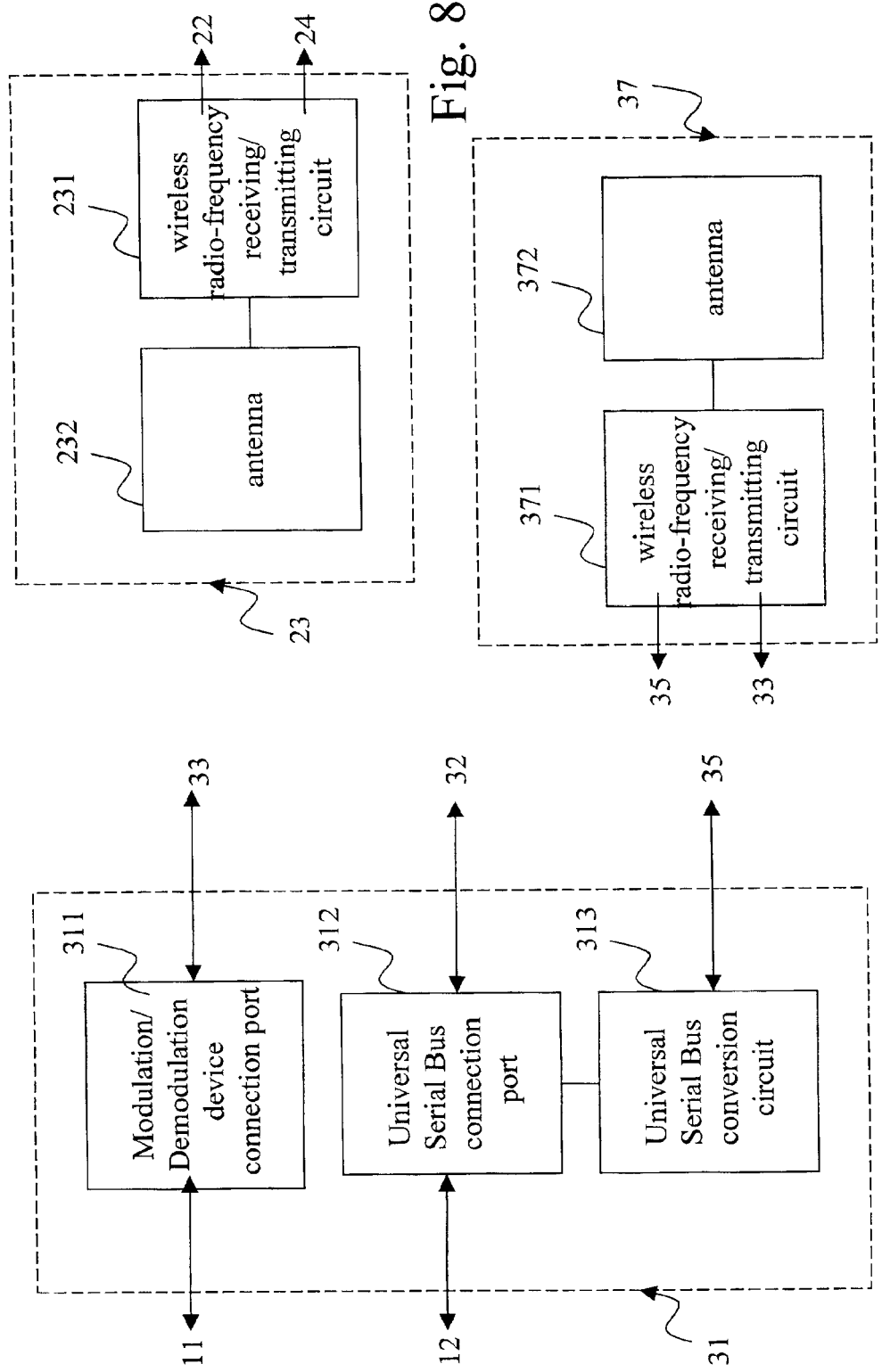

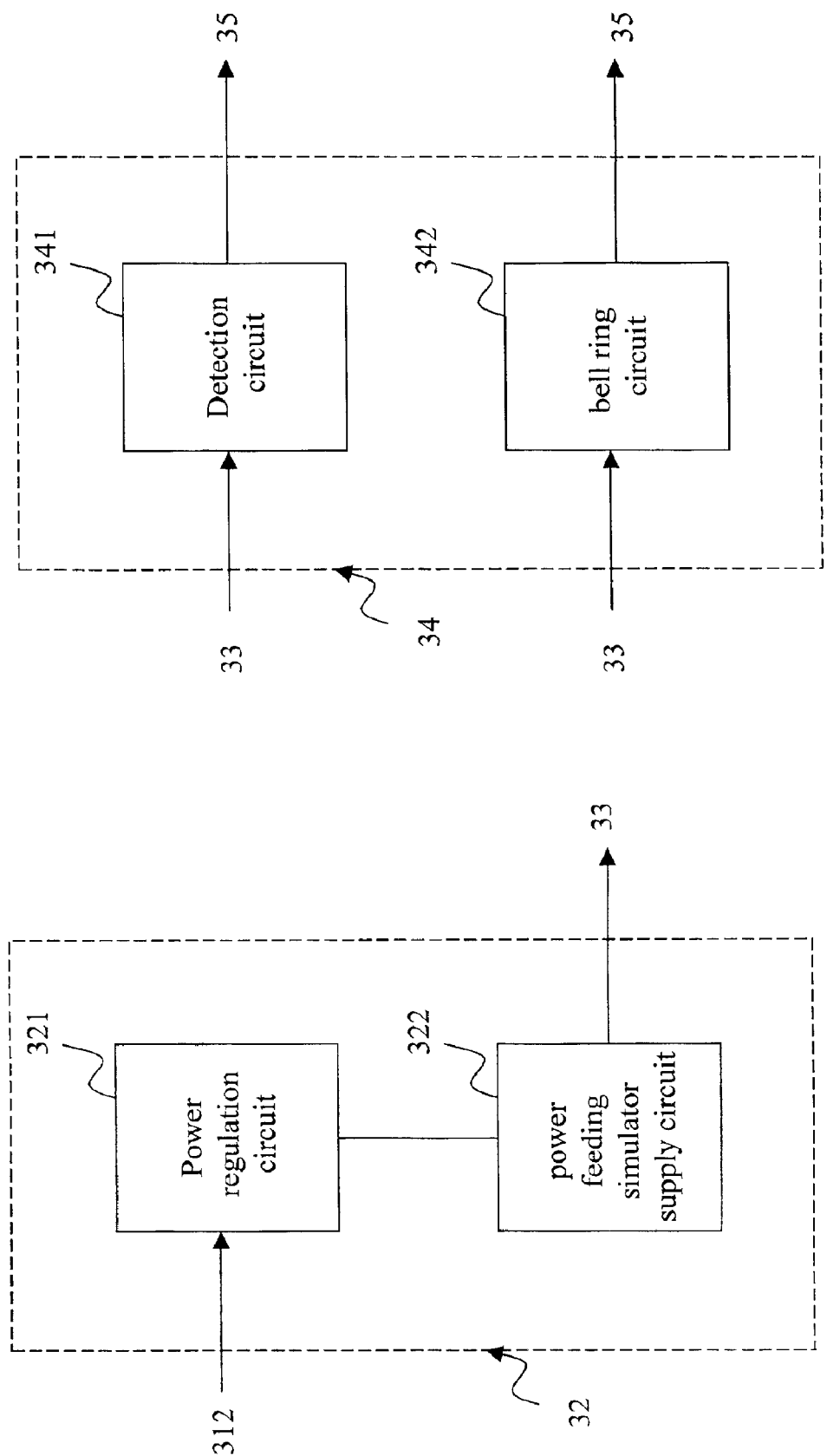

ELECTRONIC DEVICE CAPABLE OF WIRELESS DATA TRANSMISSION ON THE INTERNET

BACKGROUND OF THE INVENTION

1. Field of the Invention

The invention relates to an electronic device for data transmission on the Internet, and especially to an electronic device used in an information processing apparatus that is capable of wireless transmission over the Internet.

2. Related Art

The Internet is a world wide area network, which connects to educational institutes, governmental organizations, and various kinds of research institutes all over the world via telephone lines or dedicated lines. Users can correspond with other people via messages, electronic mail with attached files, or conduct certain commercial transactions by accessing any inter-connected network. There are many users all over the world connecting to the Internet every single second.

People may access certain information on the Internet due to the resourcefulness of the Internet. Nevertheless, in the past, an information processing apparatus was allowed to access the Internet only when connected to a telephone line. The information processing apparatus had to be displaced according to the layout and location of the telephone line, which meant that the apparatus could be only installed in some fixed place to operate the function of Internet surfing.

Recently, the portable information processing apparatus has been designed so as to cooperate with a mobile communication device to perform the function of wireless access to the Internet. This creates the advantage of Internet surfing any time a user needs, and the disadvantage of a substantially low data transfer rate at a high cost. Direct access to the Internet by the mobile communication device itself is another way of Internet surfing, which has drawbacks such as a small display size, insufficient memory, and high expense, making it less and economical.

To sum up, there is a need to make the Internet information processing apparatus capable of accessing the Internet any time a user needs while also being affordable.

SUMMARY OF THE INVENTION

The object of the invention is to propose an electronic device capable of wireless data transmission. It aims at wireless data transfer between the information processing apparatus and the telephone line when the information processing apparatus is connected to the Internet.

The device comprises a mobile component and a stationary one. The stationary component is connected to the telephone line and the mobile component is capable of moving with the device connected to the information processing apparatus for surfing the Internet. The electronic device is designed for wireless data transmission instead of wired Internet access as when the information processing apparatus has to be connected to a telephone line for Internet access.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is an illustration of the connection unit of the mobile component according to the invention.

FIGS. 8A and 8B is an illustration of the transmitting/receiving unit of the stationary component and mobile component according to the invention.

FIG. 9 is an illustration of the power supply unit of the mobile component according to the invention; and FIG. 10 is an illustration of the detection unit of the mobile component according to the invention.

DETAILED DESCRIPTION OF THE INVENTION

Figure 1:
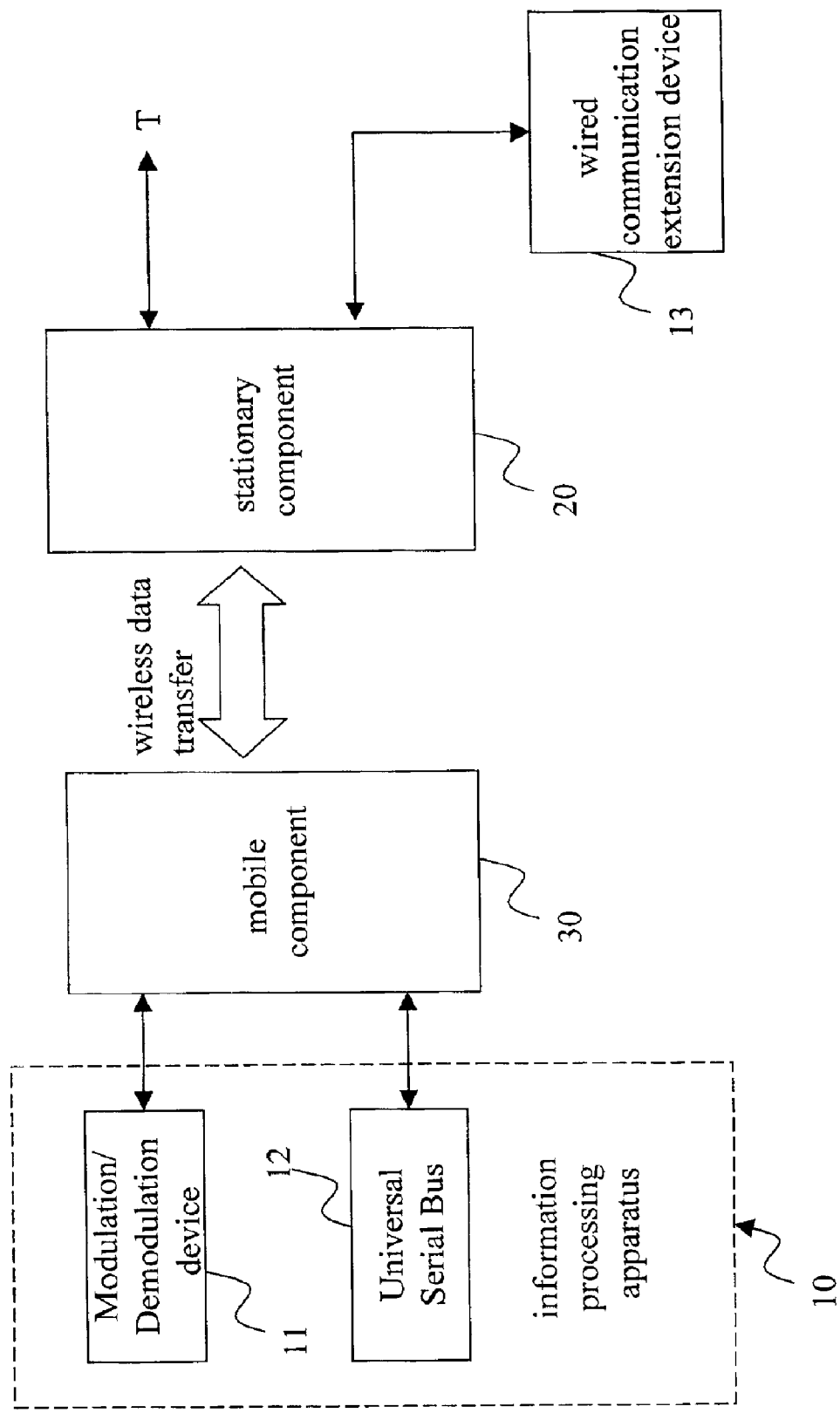
FIG. 1 is an illustration of the electronic device for wireless data transmission on the Internet according to the invention.

The invention is an electronic device capable of wireless data transmission on the Internet. The electronic device is designed for wireless data transmission instead of wired Internet access as when the information processing apparatus has to be connected to a telephone line for Internet access. FIG. 1 is an illustration of the electronic device for wireless data transmission on the Internet according to the invention.

The invention comprises a stationary component 20 and a mobile component 30. The stationary component 20 is connected to a telephone line T and a wired communication extension device 13 such as a telephone unit. The mobile component 30 is connected to the information processing apparatus 10 and communicates with the stationary component 20 in an analog and wireless way.

Figure 2:
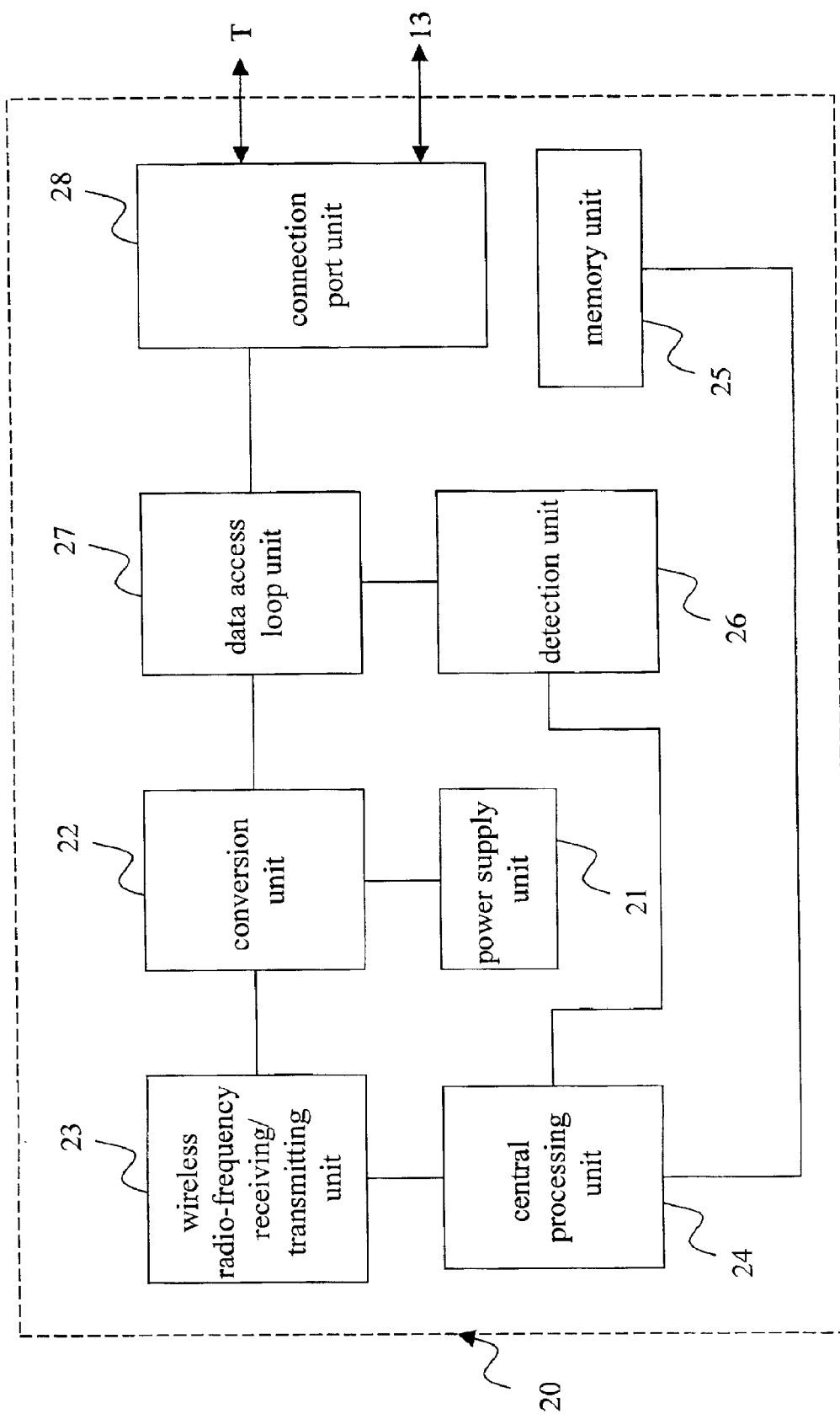
FIG. 2 is the block diagram for the stationary component of the electronic device for wireless data transmission on the Internet according to the invention.

To proceed with further description of the stationary component 20 of the invention, please refer to FIG. 2, which is a block diagram of the stationary component of the electronic device for wireless data transmission on the Internet.

The stationary component 20 of the invention comprises a power supply unit 21 for feeding the necessary power into the stationary component 20. The stationary component 20 further comprises a connection port unit 28, a data access loop unit 27, and a conversion unit 22. The connection port unit 28 is connected to the telephone line T for receiving and transmitting the information through the telephone line T. The data access loop unit 27 is a Data Access Arrangement (DAA) dedicated to wired communication and connected to the connection port unit 28 for converting the signals from the stationary component 20 into signals suitable for wired communication. The conversion unit 22 performs the function of echo cancellation and is an adaptation circuit that adapts a 2-line circuit to a 4-line circuit and is connected to the data access loop unit 27. The conversion unit 22 is used for converting the received data format into a format that matches the characteristics of a MODEM (Modulation/Demodulation). It allows for direct access to transfer/receive data and then transmits the converted data to the output port. Apart from the aforesaid units, the stationary component 20 of the invention farther comprises a detection unit 26, a central processing unit 24, a memory unit 25, and a transmitting/receiving unit 23. The detection unit 26 is connected to the data access loop unit 27 for detecting the connection status between the stationary component 20 and the telephone line T, and then transferring the connecting status to the central processing unit 24. The central processing unit 24 is a 8-bit micro-processor with Read Only Memory (ROM) and Random Access Memory (RAM) for detecting the Received Signal Strength Indication (RSSI) and then processing it. The memory unit 25 is an Electrically Erasable Programmable Read-Only Memory (EEPROM) that is connected to the central processing unit 24 for storing the random code adopted by the invention. The wireless transmitting/receiving unit 23 is connected to the central processing unit 24 and conversion unit 22. The central processing unit 24 controls the status and signals during the transmitting and receiving process. The conversion unit 22 transfers the analog data to the wireless transmitting/receiving unit 23 for modulation and demodulation and then to the Internet.

Figure 3:
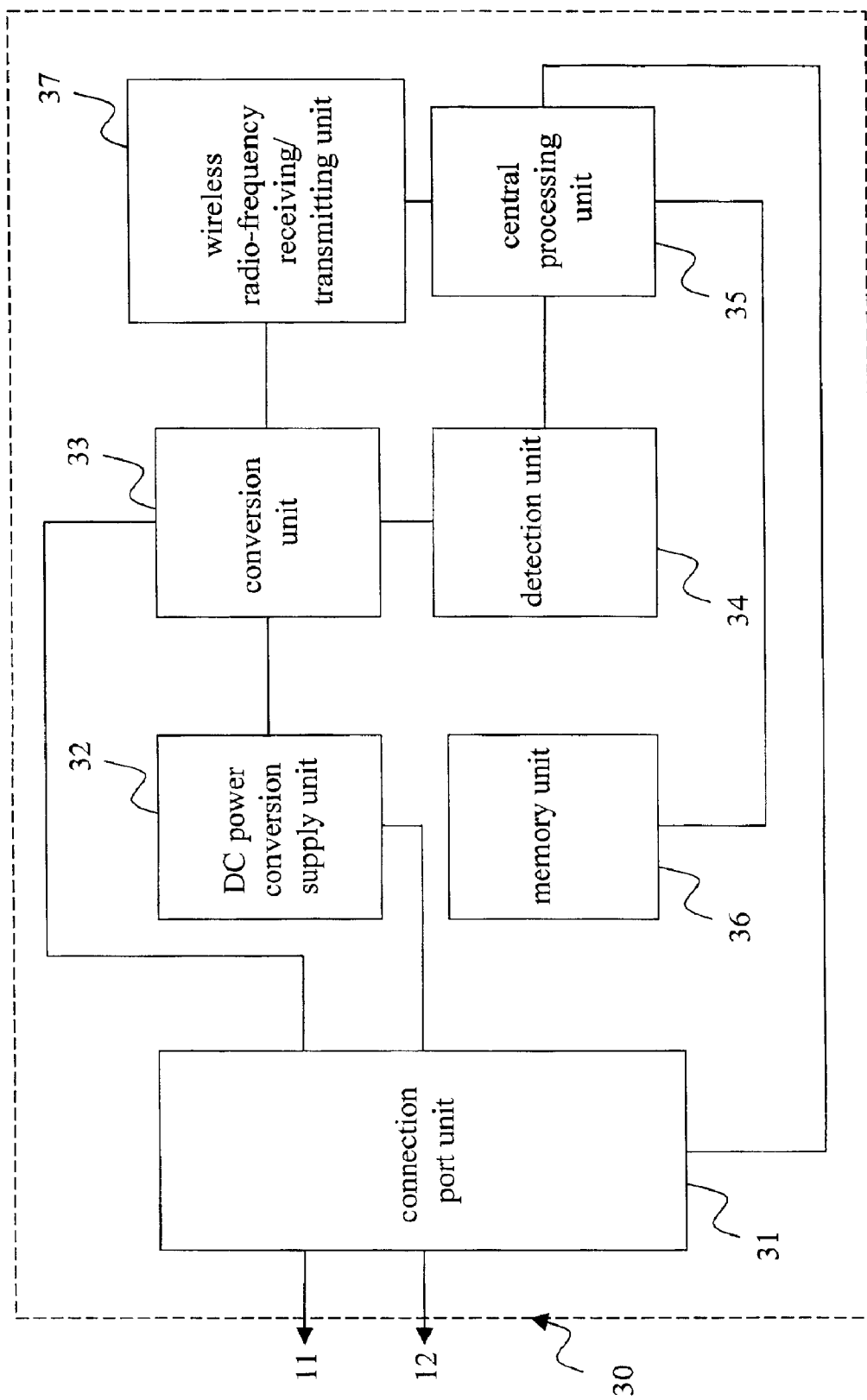
FIG. 3 is the block diagram for the mobile component of the electronic device for wireless data transmission on the Internet according to the invention.

To proceed with further description of the mobile component 30 of the invention, please refer to FIG. 3, which is a block diagram of the mobile component of the electronic device for wireless data transmission on the Internet.

The mobile component 30 of the invention comprises a connection port unit 31, a DC power conversion supply unit 32, a conversion unit 33, and a detection unit 34. The connection port unit 31 is connected to the information processing apparatus 10 for transferring data from the apparatus 10. The DC power conversion supply unit 32 is connected to the connection port unit 31 and extracts the power from the information processing apparatus 10 via a universal serial port 12 to provide a stable power supply to the mobile component 30 for its normal operation. The conversion unit 33 with the function of echo cancellation is also an adaptation circuit that adapts a 2-line circuit to a 4-line circuit and is connected to the connection port unit 31. The conversion unit 33 receives data via the connection port unit 31, converts it into an analog transmitting/receiving wired transfer data format and then transfers this data to the output port. The detection unit 34 is connected to the conversion unit 33 for detecting the connection status between the mobile component 30 and the information processing apparatus 10 and then transferring this status to the central processing unit 35. Apart from the aforesaid units, the mobile component 30 of the invention further comprises a central processing unit 35, a memory unit 36, and a wireless radio-frequency transmitting/receiving unit 37. The central processing unit 35 is also an 8-bit microprocessor with Read Only Memory (ROM) and Random Access Memory (RAM) for detecting the Received Signal Strength Indication (RSSI) and transmitting the radio communication signals. After receiving the connection status from the detection unit 34, the central processing unit 35 proceeds with processing and computing the received data and then transfers it to the wireless radio-frequency transmitting/receiving unit 37. Furthermore, with the assistance of the I²C main circuit the central processing unit 35 can set the identification code of the serial bus communication device and the corresponding gateway channel. The memory unit 36 is an Electrically Erasable Programmable Read-Only Memory (EEPROM) and is connected to the central processing unit 35 for storing the identification code adopted by the electronic units of the invention. The wireless radio-frequency transmitting/receiving unit 37 is connected to the central processing unit 35 and the conversion unit 33 for receiving and transmitting the modulated and demodulated data from the central processing unit 35 and for transmitting the Internet information. Moreover, the transmitting/receiving unit 37 modulates the wirelessly transmitted data in an analog way and demodulates the wirelessly received data.

Figure 4:
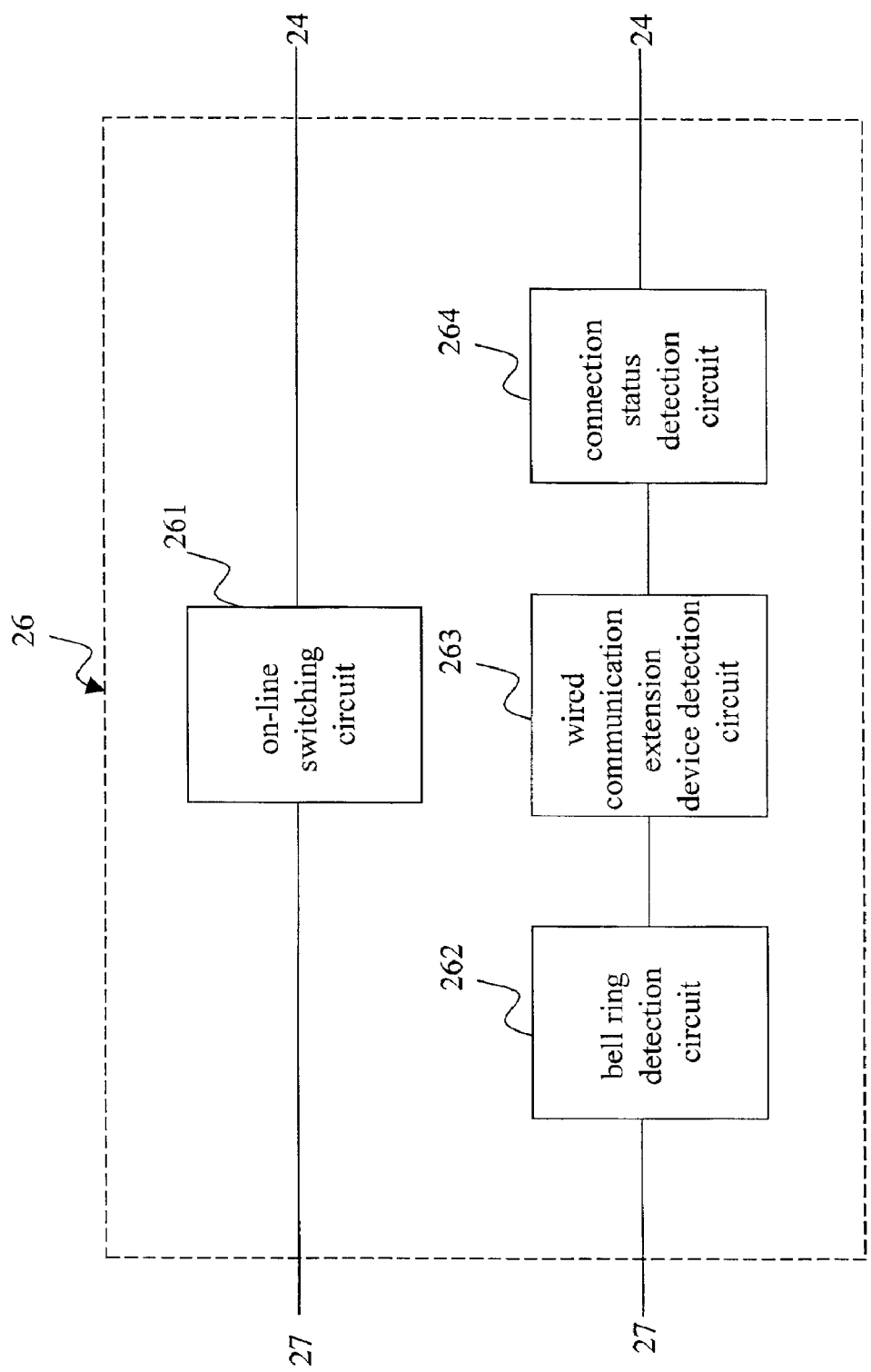
FIG. 4 is an illustration of the detection unit of the stationary component according to the invention.
Figure 6:
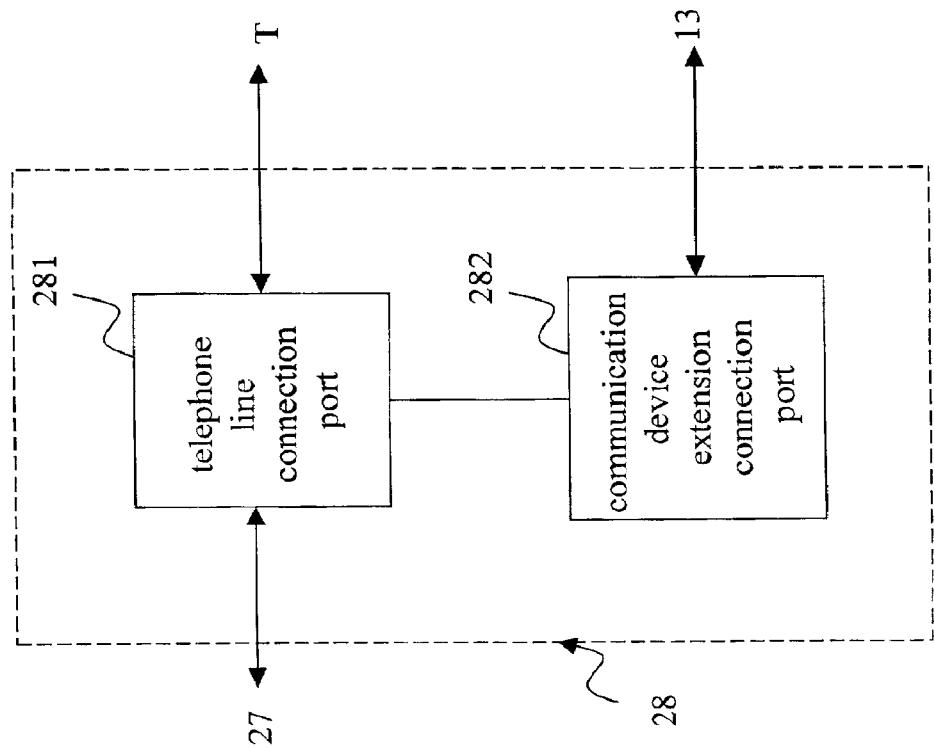
FIG. 6 is an illustration of the connection unit of the stationary component according to the invention.
Figure 5:
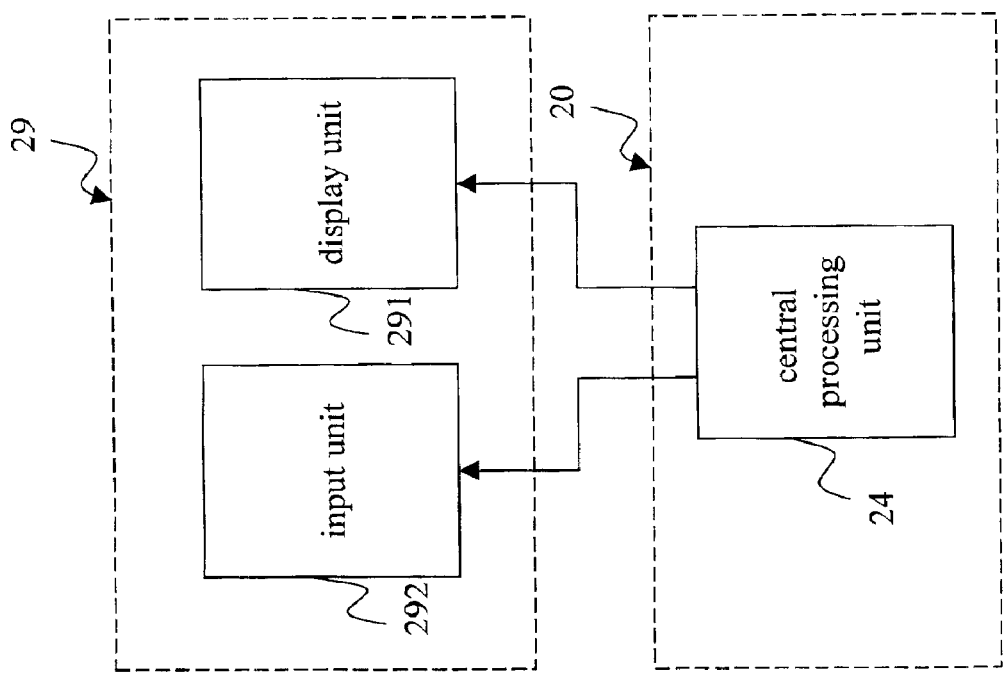
FIG. 5 is an illustration of the external connection unit of the stationary component according to the invention.

To proceed with further description of the aforesaid stationary component 20, please refer to FIGS. 4, 5, and 6, which are illustrations of the detection unit, the external connection unit, and the connection port of the invention.

The detection unit 26 of the stationary component 20 according to the invention further comprises a data access switching circuit 261, a bell ring detection unit 262, a wired communication extension device detection circuit 263, and a connection status detection unit 264. The bell ring detection unit 262 is connected to the data access loop unit 27 for detecting an incoming phone call from the telephone line T and then sending the detected result to the central processing unit 24. The wired communication extension device detection circuit 263 is connected to the data access loop unit 27 for detecting the status of the wired communication extension device 13 and then sending the detected result to the central processing unit 24. The connection status detection unit 264 is also connected to the data access loop unit 27 for detecting the connection status between the stationary component 20 and the telephone line T and then sending the detected result to the central processing unit 24. The data access switching circuit 261 is connected to the data access loop unit 27 for controlling the telephone line T. An incoming call can be received by the wired communication extension device 13 by switching the connection port 282 of the wired communication extension device 13 when there is an incoming call through the telephone line T.

The stationary component 20 of the invention further comprises an external connection unit 29, which comprises a display unit 291 connected to the central processing unit 24. The display unit 291 consists of Light Emitting Diodes (LED) for displaying the working status of the electronic device of the invention. The input unit 292 is a keyboard connected to the central processing unit 24 for handling the random code pairing operation. When in normal operation, the input key on the mobile component 30, which is installed on the information processing apparatus 10, and another input key on the stationary component 20, should be pressed simultaneously to activate the central processing unit 24 and generate a random identification code. When the encrypted identification code is examined and identified as without error, wireless communication between the mobile component 30 and the stationary component 20 is established.

The connection port unit 28 of the stationary component 20 further comprises a connection port 281 for receiving the telephone line and a connection port 282 for the wired communication extension device. The connection port 281 for receiving the telephone line is an RJ11-type socket connected to the telephone line T and the data access loop unit 27 for transmitting and receiving data. The connection port 281 for receiving the telephone line and the connection port 282 for the wired communication extension device are linked together and connected to the wired communication extension device 28.

To proceed with further description of for the aforesaid mobile component 30, please refer to FIGS. 7, 8A, 8B, 9, and 10, which are illustrations of the connection port unit, the wireless radio-frequency transmitting/receiving unit, the DC power conversion supply unit, and the detection unit of the mobile component according to the invention. There is also an illustration of the wireless radio-frequency transmitting/receiving unit of the invention in FIGS. 8A and 8B.

The connection port 31 of the mobile component 30 comprises a connection port 311 for the Modulation/Demodulation device, a connection port 312 for the Universal Serial Bus, and a driver conversion circuit 313 for the serial bus. The connection port 311 for the Modulation/Demodulation device is an RJ11 type socket and is connected to the conversion unit 33 for linking to the Modulation/Demodulation device 11 (Modem). The connection port 312 is connected to the Universal Serial Bus 12 (USB) of the information processing apparatus 10 for receiving and transmitting data in Universal-Serial-Bus format. Moreover, the connection port 312 extracts some power from the information processing apparatus 10 and transfers it to the DC power conversion supply unit 32. The driver conversion circuit 313 is connected to the connection port 312 of the Universal Serial Bus (USB) for converting data from Universal-Serial-Bus format to general parallel I$^2$C format and then transferring it to the central processing unit 35.

The wireless radio-frequency transmitting/receiving unit 37 of the mobile component 30 comprises a transmitting/receiving circuit 371 and an antenna unit 372. The transmitting/receiving circuit 371 is a module circuit with a radio frequency of 900 MHz and is connected to the central processing unit 35 and the conversion unit 33 for data modulated transmission and data demodulated reception. The antenna unit 372 is connected to the transmitting/receiving circuit 371 for wireless data transmission. Similarly, there are also a wireless radio-frequency transmitting/receiving circuit 231 and an antenna unit 232 in the stationary component 20. Since their method of installation and their function are the same as those of the transmitting/receiving unit 37 in the mobile component 30, further description will not be provided here.

The DC power conversion supply unit 32 further comprises a power regulation circuit 321 and a power feeding simulator circuit 322. The power regulation circuit 321 is a DC-to-DC converter circuit, which is connected to the connection port 312 of the Universal Serial Bus and is used for receiving the electric power from the information processing apparatus 10. After converting and power regulating, the electric power is further fed to certain units of the mobile component 30 and the power feeding simulator circuit 322. The power feeding simulator circuit 322 comprises a DC-to-DC converter circuit and a line-hold current circuit for power converting and boosting in order to provide the mobile component 30 with suitable power for normal on-line operation. It is adaptable to communication at different distances.

The detection unit 34 of the mobile component 30 further comprises a detection circuit 341 and a bell ring circuit 342. The detection circuit 341 is connected to the conversion unit 33 for detection the connection status between the mobile component 30 and the information processing apparatus 10 and then transferring the detected result to the central processing unit 35. The bell ring circuit 342 is also connected to the conversion unit 33 for generating a bell ring to notify the user when there is an incoming call through the telephone line T.

To summarize the aforesaid descriptions, the invention is an electronic device capable of wireless data transmission on the Internet with the advantages of improving efficiency and reducing inconvenience caused by wired Internet access. While the invention provides users the convenience of wireless Internet access, the cost does not exceed that incurred with wired Internet access.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device capable of wireless data transmission of the Internet and especially for transferring information between a information processing apparatus and a telephone line when said information processing apparatus is accessing to Internet, which comprises:

a stationary component connected to the telephone line for transferring wireless information in an analog way; and a mobile component connected to said information processing apparatus for wireless communicating with said stationary component in an analog way, wherein said stationary component further comprises:

a power supply unit for feeding necessary operation power into said stationary component;

a connection port unit connected to said telephone line for receiving and transmitting the information from said telephone line;

a data access loop unit connected to said connection port unit for converting the signals from said stationary component into the ones suitable for wired communication transmission;

a conversion unit connected to said data access loop unit for converting the received data type into the type of analog receiving/transmitting and wired transferring and then transmitting the converted data as an output;

a detection unit connected to said data access loop unit for detecting the connecting status between said stationary component and said telephone line and then transferring said connecting status to as an output;

a central processing unit connected to said detection unit for detecting the result from said detection unit, processing and computing said result, and then sending said result to a control port;

a memory unit connected to said central processing unit for storing random codes adopted by said electronic device capable of wireless data transmission of the Internet;

a radio-frequency wireless transmitting/receiving unit connected to said central processing unit and said conversion unit for transmitting a modulation/demodulation signal to said central processing unit for processing and then performing modulated transmission and demodulated reception for said processed signal in an analog and wireless way; and an external connection unit connected to said central processing unit for displaying the status of said stationary component and inputting random codes adopted by said electronic device capable of wireless data transmission of the Internet.

2. The electronic device capable of wireless data transmission of the Internet as disclosed in claim 1, wherein said connection port unit of said stationary component further comprises:
a connection port for receiving said telephone line connected to said telephone line and said information processing apparatus for transmitting and receiving data; and
a connection port for receiving a wired communication extension device connected to said connection port for receiving said telephone line.

3. The electronic device capable of wireless data transmission of the Internet as disclosed in claim 1, wherein said detection unit of said stationary component further comprises:
a bell ring detection unit connected to said data access loop unit for detecting the incoming phone call from said telephone line and then sending the detected result to said central processing unit;
a wired communication extension device detection circuit connected to said data access loop unit for detecting the status of a wired communication extension device and then sending the detected result to said central processing unit;
a connection status detection unit connected to said data access loop unit for detecting the connection status between said stationary component and said telephone line and then sending the detected result to said central processing unit; and
a data access switching circuit connected to said data access loop unit for switching an incoming call to a wired communication extension device.

4. The electronic device capable of wireless data transmission of the Internet as disclosed in claim 1, wherein said external connection unit further comprises:
a display unit connected to said central processing unit for displaying the working status of said electronic device capable of wireless data transmission of the Internet; and
an input unit connected to said central processing unit for inputting random codes adopted by said electronic device to said central processing device for code identification.

5. The electronic device capable of wireless data transmission of the Internet as disclosed in claim 1, wherein said radio-frequency wireless transmitting/receiving unit of said stationary component further comprises:
a wireless radio-frequency transmitting/receiving circuit connected to said central processing unit and said conversion unit for wireless modulated transmission and demodulated reception of data; and
an antenna connected to said wireless radio-frequency transmitting/receiving circuit for wireless transmission of data.

6. The electronic device capable of wireless data transmission of the Internet as disclosed in claim 1, wherein said conversion unit of said stationary component is an adaptation circuit that adapts a 2-line circuit into a 4-line one with the function of echo cancellation for meeting the data transfer requirement of direct access to Internet.

7. The electronic device capable of wireless data transmission of the Internet as disclosed in claim 1, wherein said central processing unit of said stationary component is an 8-bit microprocessor.

8. The electronic device capable of wireless data transmission of the Internet as disclosed in claim 1, wherein said memory unit of said stationary component is an Electrically Erasable Programmable Read-Only Memory (EEPROM).

9. The electronic device capable of wireless data transmission of the Internet as disclosed in claim 1, wherein said memory unit of said stationary component is a Data Access Arrangement (DAA) circuit.

10. The electronic device capable of wireless data transmission of the Internet as disclosed in claim 1, wherein said information processing apparatus is a personal computer.

11. The electronic device capable of wireless data transmission of the Internet as disclosed in claim 1, wherein said information processing apparatus is a notebook computer.

12. An electronic device capable of wireless data transmission of the Internet and especially for transferring information between a information processing apparatus and a telephone line when said information processing apparatus is accessing to Internet, which comprises:
a stationary component connected to the telephone line for transferring wireless information in an analog way; and
a mobile component connected to said information processing apparatus for wireless communicating with said stationary component in an analog way,
wherein said mobile component further comprises:
a connection port unit connected to said information processing apparatus for transferring data from said apparatus;
a DC power conversion supply unit connected to said connection port unit for extracting the power from said information processing apparatus via a universal serial port to provide a stable power level to said mobile component for its normal operation;
a conversion unit connected to the connection port unit for receiving data via said connection port unit, converting it into analog transmitting/receiving wired transfer data type, and then transferring such data as an output;
a detection unit connected to said conversion unit for detecting the connection status between said mobile component and said information processing apparatus and then transferring said status as an output;
a central processing unit connected to said detection unit for detecting the result from said detection unit, processing and computing said result, and then sending said result to a control port;
a memory unit connected to said central processing unit for storing random codes adopted by said electronic device capable of wireless data transmission of the Internet; and
a radio-frequency wireless transmitting/receiving unit connected to said central processing unit and said conversion unit for transmitting a modulation/demodulation signal to said central processing unit for processing and then performing modulated transmission and demodulated reception for said processed signal in an analog and wireless way.

13. The electronic device capable of wireless data transmission of the Internet as disclosed in claim 12, wherein said connection port unit of said mobile component further comprises:
a connection port connected to said conversion unit for the connection of an external Modulation/Demodulation device;
a connection port connected to a Universal Serial Bus ( USB ) of said information processing apparatus for receiving and transmitting data in the Universal-Serial-Bus format; and a serial bus conversion circuit connected to a I²C connection port of the serial bus for converting the data of Universal-Serial-Bus format into the general universal I²C format and then transferring it to said central processing unit.

14. The electronic device capable of wireless data transmission of the Internet as disclosed in claim 12, wherein said detection unit of said mobile component further comprises:

a detection circuit connected to said conversion unit for detecting the connection status between said mobile component and said information processing apparatus and sending said connection status to said central processing unit; and a bell ring circuit connected to said conversion unit for generating a bell ringing when there is an incoming call from the telephone line.

15. The electronic device capable of wireless data transmission of the Internet as disclosed in claim 12, wherein said radio-frequency wireless transmitting/receiving unit of said mobile component further comprises:

a wireless radio-frequency transmitting/receiving circuit connected to said central processing unit and said conversion unit for wireless modulated transmission and demodulated reception of data; and an antenna connected to said wireless radio-frequency transmitting/receiving circuit for wireless transmission of data.

16. The electronic device capable of wireless data transmission of the Internet as disclosed in claim 12, wherein said DC power further comprises:

a power regulation circuit connected to said connection port of Universal Serial Bus for extracting the electric power from said information processing apparatus as an output after converting and regulating said power; and a power feeding simulator circuit connected to said power regulation circuit for converting and boosting the power from said information processing apparatus and keeping the line-hold current in order to provide said mobile component with a power suitable for normal on-line operation.

17. The electronic device capable of wireless data transmission of the Internet as disclosed in claim 12, wherein said conversion unit of said mobile component is an adaptation circuit that adapts a 2-line circuit into a 4-line one with the function of echo cancellation for meeting the data transfer requirement of direct access to Internet.

18. The electronic device capable of wireless data transmission of the Internet as disclosed in claim 12, wherein said central processing unit of said mobile component is an 8-bit microprocessor.

19. The electronic device capable of wireless data transmission of the Internet as disclosed in claim 12, wherein said memory unit of said mobile component is an Electrically Erasable Programmable Read-Only Memory (EEPROM).

* * * * *